Oct. 18, 1927.
G. B. STARKWEATHER
1,645,779
AIRCRAFT
Filed Jan. 11, 1926
4 Sheets-Sheet 3
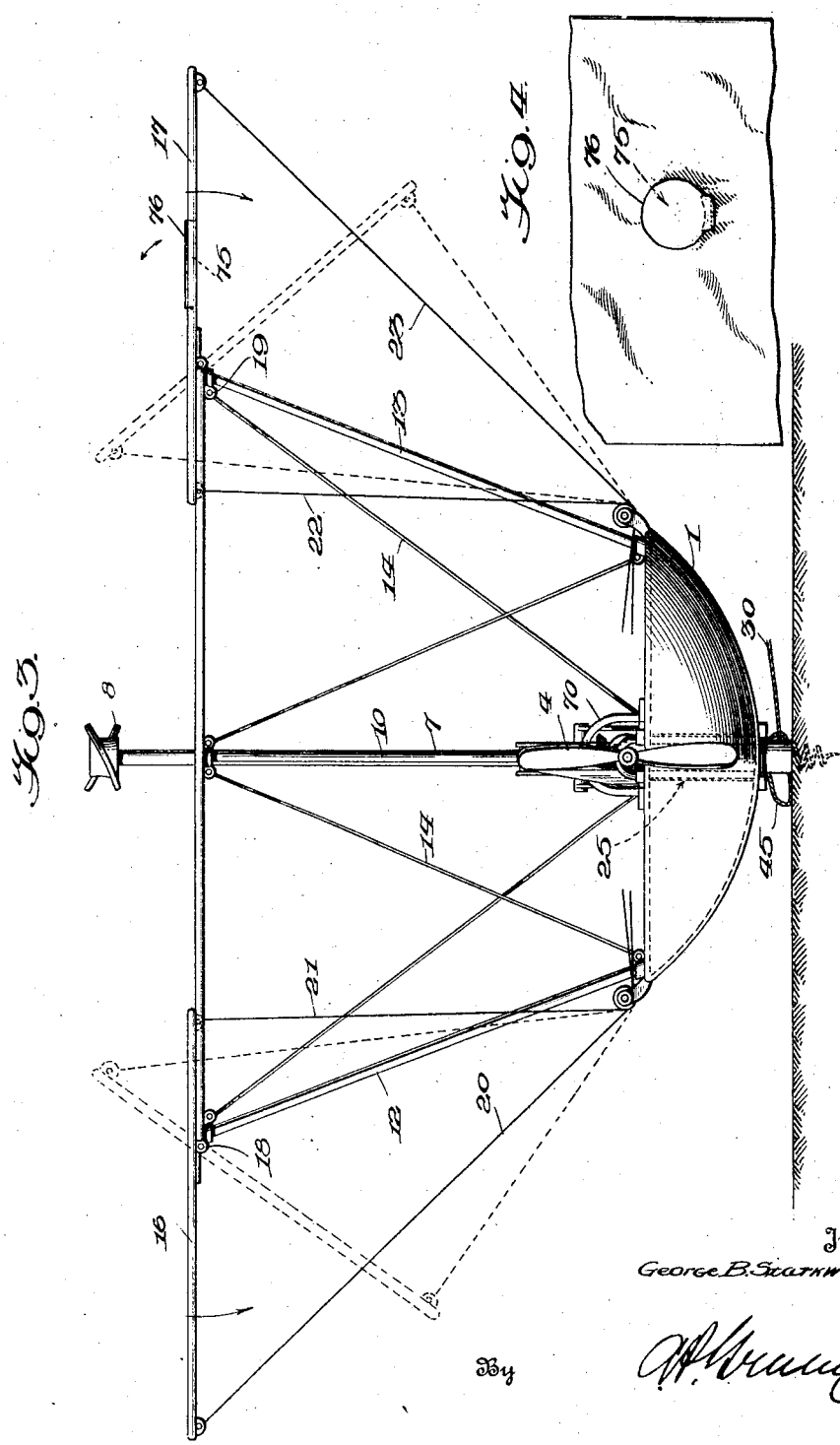
Inventor
George B. Starkweather,
By
Attorney

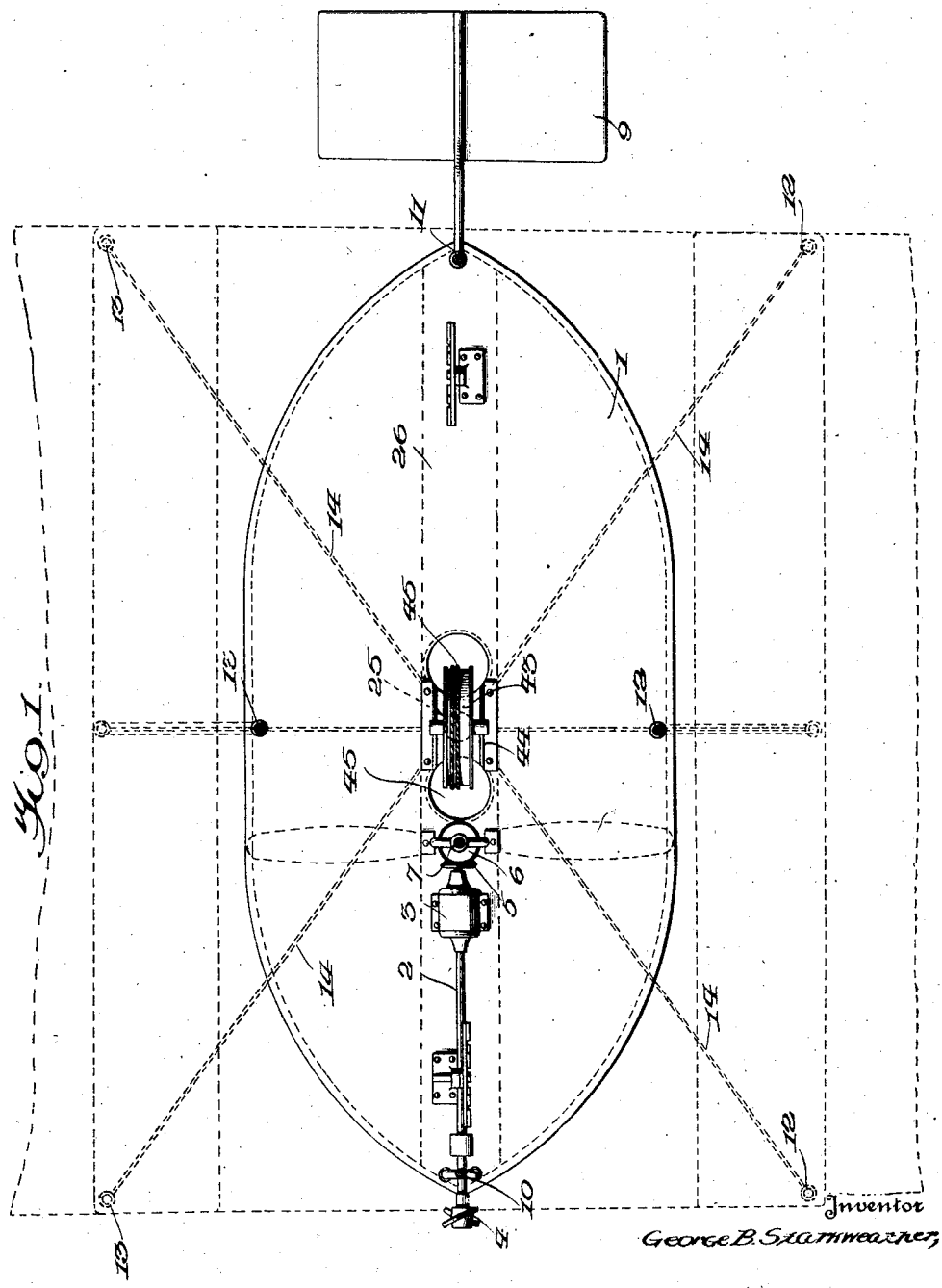

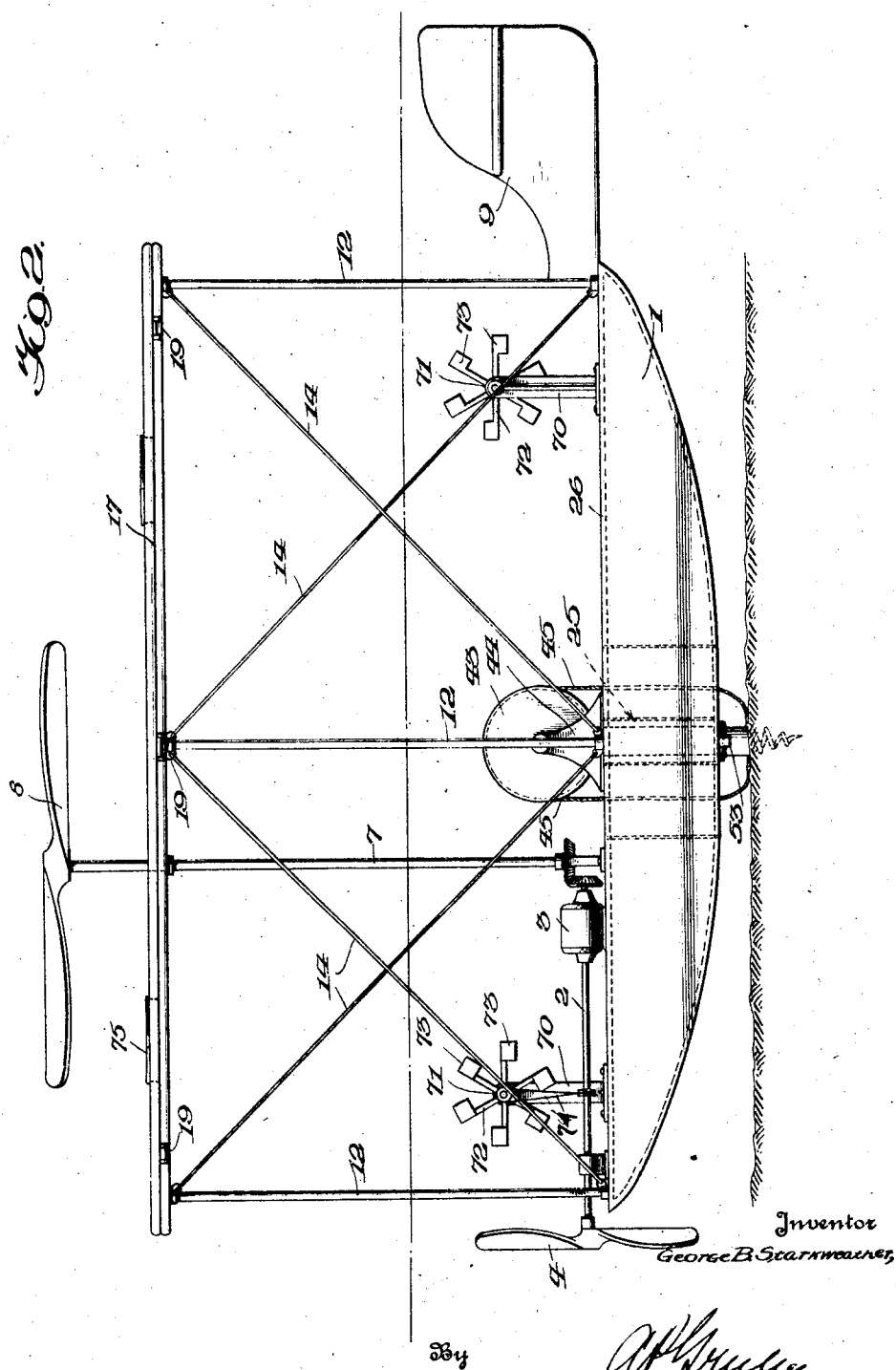

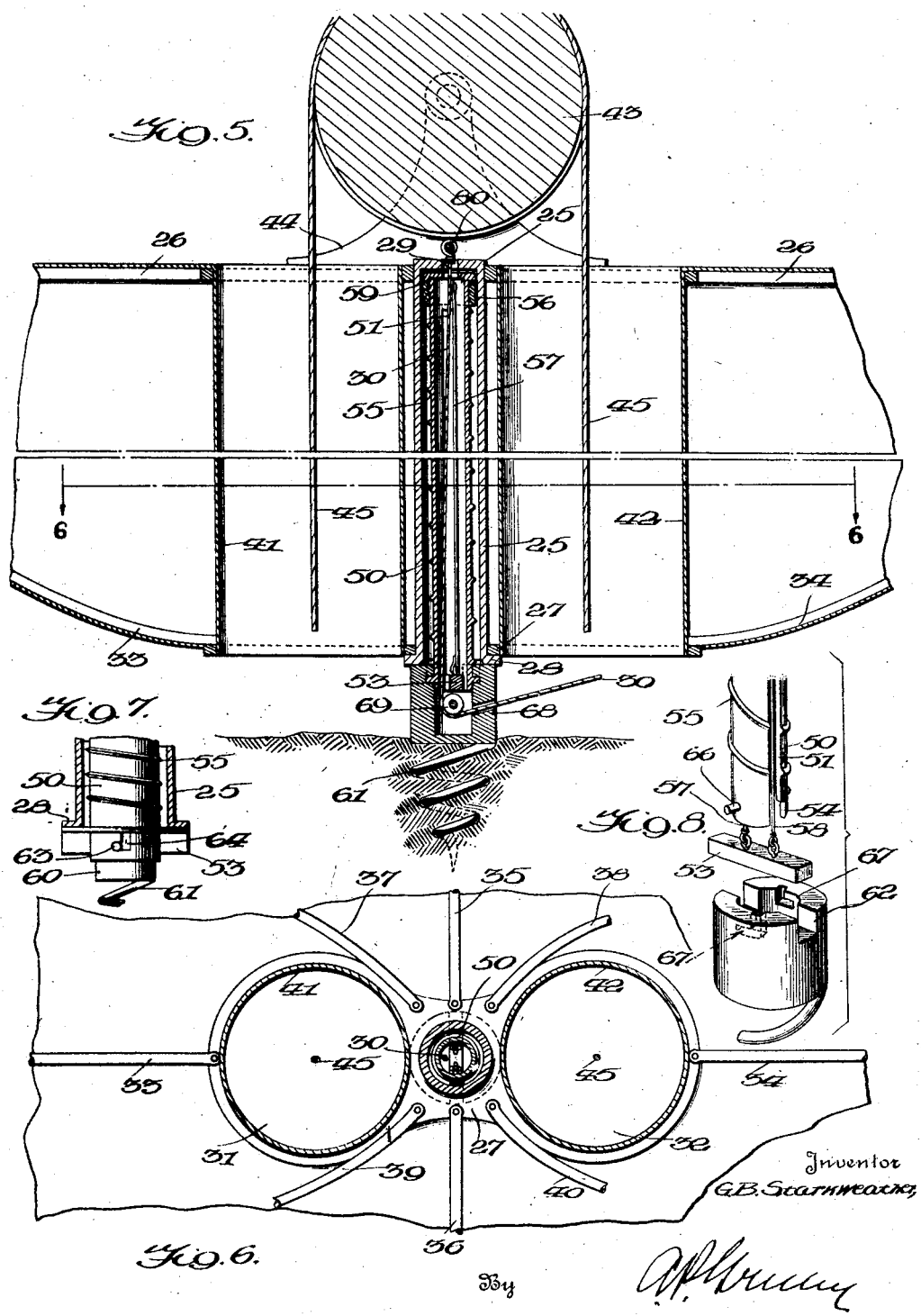

Patented Oct. 18, 1927.

1,645,779

UNITED STATES PATENT OFFICE.

GEORGE B. STARKWEATHER, OF WASHINGTON, DISTRICT OF COLUMBIA.

AIRCRAFT.

Application filed January 11, 1926. Serial No. 80,533.

My invention relates to air craft of the heavier-than-air type and has for its object to provide one of this type which will, withal, be particularly adapted for effective service in unexplored or other regions in which suitable fields for landing with an aeroplane equipped with the landing gear commonly used would be difficult or impossible to find, and where any means of sheltering the aeroplane when at rest would be equally difficult or impossible to find.

For effective use in exploring unknown regions such as the frozen regions of the Arctic or Antarctic and mountainous regions it is necessary to have the aeroplane not only adapted to land where alighting might be impossible for a machine with landing gear adapted for descending upon a level field, but adapted also to remain without damage wherever it may land and to be adapted to take flight readily from its landing place.

It is an especial object of this invention to provide a construction of aeroplane and landing and anchoring means for use with it by which the important requirements for satisfactory results with an aeroplane in exploration work may be secured.

With the objects above indicated, and other objects hereinafter explained in view, my invention consists in the construction and combination of elements hereinafter described and claimed.

Referring to the drawings:—

Figure 1 is a top plan view of the body or hull of an aeroplane embodying my invention.

Figure 2 is a side view of the same showing the aeroplane at anchor.

Figure 3 is a front view of the same.

Figure 4 is a detail plan view of a portion of one of the wings.

Figure 5 is a longitudinal vertical central sectional view on an enlarged scale of the construction at the center of the aeroplane.

Figure 6 is a horizontal sectional view on line 6—6 of Figure 5.

Figure 7 is a detail view showing the preferred construction for connecting the anchor part with its base socket and Figure 8 is a view showing a modified construction for connecting the anchor part with its base socket.

In the drawings 1 indicates the boat shaped body or hull of my aeroplane, 2 indicates the main shaft driven by motor 3 carrying at its forward end propeller 4 and connected in any convenient manner as by bevel gears 5, 6, with a vertical shaft 7, near but somewhat forward of the center of the body or hull, carrying at its upper end a helicopter or lifting propeller 8. It is of course to be understood that the connections are such that either the forward propeller or the helicopter or both may be driven at any one time. At the rear end of the body or hull are arranged the usual rudders 9. From the upper edges of the body or hull 1 struts 10, 11, 12 and 13 extend upward a suitable distance above the plane of the upper edges of the body or hull, the struts 12 and 13 being preferably inclined outward as shown. The upper ends of these struts are suitably connected at their upper ends and braced by diagonals 14 so as to form a rigid superstructure sufficiently strong to support wings 16 and 17 which are hinged to the side bars of the superstructure at 18 and 19 respectively so as to be swung by cords 20, 21 and 22, 23 to the horizontal position in which they are shown in Figure 3 in full lines when the aeroplane is to be driven forward by propeller 4 or when settling down on to the anchoring device, and to be swung to the position in which they are shown by broken lines in Figure 3, so as to lessen the resistance to the rising of the aeroplane under the action of the helicopter 8 or under the action of the catapult hereinafter described. The construction thus far shown and described is to be understood as conventional so far as its general features are concerned, and as a typical form of aeroplane to which my invention may be applied. It is not intended to limit the invention to its use with the particular construction of aeroplane shown.

At the center of gravity of the body or hull 1 I arrange a vertical tubular socket 25 extending from the bottom of the body or hull to the plane of its upper edges, which may for convenience be termed its deck level, though the hull or body is not intended to be decked over, though it may have from front to rear end a central strip 26 to serve as a support for the motor, driving shaft and other necessary mechanism. At the center of the bottom of the body or hull is arranged a forging or plate 27 through the center of which the tubular socket 25 extends, the lower end of the tubular socket being outwardly turned to form a bearing flange 28 for a purpose to be explained. This tubular socket 25 is closed at its upper end except for a central opening 29 for passage of a rope 30.

In addition to the central opening in which is secured the lower end of the tubular socket 25, the forging or plate 27 has formed in it two openings, 31 and 32, each of a diameter large enough to permit a member of the crew to pass through it. Opening 31 is forward of the center and opening 32 is to the rear of the center. From this forging or plate 27 ribs 33, 34, extend forward and rearward, ribs 35 and 36 extend from the central at right angles to the longitudinal center line and ribs 37, 38, 39 and 40 extend diagonally from the center to the struts at the corners of the superstructure. The number of these ribs may be increased as may be required to afford sufficient support to the outer skin or shell of the body or hull.

Secured to and rising from the rims of the openings 31 and 32 are cylinders 41 and 42 extending to the deck level forming manholes through which the members of the crew may get aboard or leave the craft. To aid in the passage of members of the crew through these manholes I provide a drum 43 having bearings in brackets 44 secured to the longitudinal deck strip 26 on opposite sides of the center. This drum 43 carries a rope 45 preferably wound at least twice about it and the diameter of the drum is such that one portion of the rope hangs down at the center of the forward manhole and the other hangs down at the center of the rear manhole. The rope 45 is preferably endless and may be of any length desired.

The tubular socket 25 is intended to receive a post 50 which, when secured at its lower end to a suitable stationary support, may serve to hold the aeroplane from bodily movement in any direction while permitting it to rotate like a weathervane about it as an axis, and is provided with means by which the aeroplane may be impelled upward when it is desired to leave its anchorage to aid the lifting effect of the helicopter 8.

This post 50 is preferably closed at its upper end except for a central opening for the passage of rope 30, is provided at diametrically opposite points with slots 51, adapted to permit the cross bar 53 to pass freely through them, has at the lower end of each slot a lateral notch 54 adapted to receive and retain the portions of the cross bar which extend through these slots. The post is provided on its exterior with a screw thread 55 and a nut 56 having its exterior diameter somewhat less than the inner diameter of the tubular socket 25, the arrangement being such that by screwing the nut down on the post the cross bar 53 will be forced downward to the lateral notches 54 against the force of elastic strips 57, 58 which are secured at their upper ends to the head 59 of the post and secured at their lower ends to the cross bar 53. After the cross bar has been thus forced down and engaged in the notches 54 the nut should be returned to the upper end of the port. This will leave the cross bar at the lower end of the post under tension of the elastic strips 57, 58. The cross bar is of such length, that its ends bear against the outturned bearing flange 28 so that when released from the notches 54 it will be forcibly impelled upward by the elastic strips and will force the aeroplane bodily upward, the force being dependent upon the strength of the elastic strips and being that of a catapult.

The post 50 is to be secured to a stationary socket 60 here shown as carried by a screw or earth auger 61 of any convenient length adapted to be screwed into the earth at the point where the aeroplane is to land. Any convenient means by which this socket may be fixedly secured in position in earth or rock or ice or any other surface material may be used in place of the earth auger it being essential only that the socket be firmly held in fixed position. The socket 60 is provided at diametrically opposite points with notches 62 extending downward from its upper face to receive the cross bar 53. In the preferred construction the socket extends upward within the lower end of the post 50 and is provided on its exterior with pins 63 with which bayonet slots 64 formed in the lower end portion of the post and adapted to engage to lock the post to the socket. In this construction, as shown in Figure 7, the post is provided with an outwardly extending annular flange 65, having openings through it for the cross bar 53, to serve as a bearing flange on which the outturned flange 28 bears.

Instead of this arrangement the lower end of the post may extend into the socket and may carry pins 66 to engage bayonet slots 67 in the interior of the socket, as shown in Figure 8, the upper face of the socket in this construction serving as the bearing for the flange 28.

The socket is preferably provided with a side opening 68 for passage of rope 30 and is provided within it with guide pulley 69 for this rope.

Mounted in suitable supports 70, here shown as of inverted U shape, carried by the longitudinal deck strip 26, are one or more stabilizers, each comprising a hub 71, with radial spokes 72 arranged in the vertical plane of the central longitudinal line of the body or hull, each provided with a flag-like piece 73 of thin material, preferably sheet metal extending tangentially from it. One of these stabilizers is preferably arranged near the forward end of the body or hull, and the other near its rear end, and they may be free to be rotated by the air current as the aeroplane passes through the air, or may be positively driven as by a belt 74 from the main shaft 2.

The wings 16 and 17 are each preferably provided with one or more openings 75, here shown as circular, each provided with a flap 76 slightly less in area than the opening 75 and flexibly secured at its forward edge to the material of the wing at the forward edge of the opening 75, the flap being normally held by the elasticity of the material of which it is formed, in the opening 75 in line with the main portion of the wing, but being free to swing upward or downward in response to air currents and to thus aid in stabilizing.

While the aeroplane is shown as a monoplane it will be understood that my invention is equally applicable to a biplane or to an aeroplane having more than two pairs of wings.

It being assumed that the aeroplane is on a flight through the air and it is desired to make a landing and there is no field suitable for landing and no open water of sufficient extent. The speed of the aeroplane is reduced so far as possible without crashing and if necessary the helicopter is set in operation to hold the aeroplane from dropping too rapidly. By means of the rope 45 one, or more, of the crew lowers himself through one of the manholes to the ground carrying with him, or having lowered to him a post 50 and a socket 60 with such tools as may be required to set the socket firmly in the earth, rock, ice or other surface material. He, or they, then set the socket 60 firmly in the surface material and lock the post 50 to it. Then by screwing nut 56 downward on screwthreads 55 the cross bar 53 is forced down to the lower end of the post putting the elastic 57, 58 under tension, and the cross bar is rotated sufficiently to cause it to be engaged in notches 54.

While the post is being thus set in place the aeroplane may circle about near the landing place picked out, so as to be brought back when the post is set to a position to bring the socket 25 as nearly as possible directly over and in line with the post. The lower end of rope 30 is dropped down and, by the man or men on the ground is passed through the opening in the upper end of the post down through the post around pulley 69 and out through opening 68. The knot 80 at the upper end of the rope prevents the rope from getting away while permitting the rope to be drawn up and coiled away when not needed for use. The rope having been passed through the post and out through opening 68 in the socket and the helicopter being operated to prevent the aeroplane from dropping, a pull on rope 30 will bring the socket 25 into line with the post and down onto it until the flange 28 rests on the supporting flange. The rotation of the helicopter being stopped the aeroplane will come to rest. Whatever the direction of the wind may be after the aeroplane is thus brought to rest the aeroplane will turn on the post as a pivot to point into the wind just as a weather vane turns to point into the wind. And as the wind will not press against the side of the aeroplane even a wind of high velocity will have little effect. The aeroplane may rest on the post as long as may be desired.

When it is desired to resume flight the rope 30 is drawn up through the post and the upper end of the socket and coiled or otherwise disposed of so as to be out of the way. The helicopter is then set in operation the wings 16 and 17 being turned down so as to lessen the resistance to upward movement. The cross bar 53 is then disengaged from the notches 54 by a pull by any convenient instrument on its ends and the elastics 57, 58, immediately impel the aeroplane upward to free it from the post. The combined effect of this upward impulse and the lifting of the helicopter will raise the aeroplane sufficiently above the ground surface for safe flight. As the aeroplane reaches the necessary height the wings are swung to horizontal position and the propeller 61 is started.

After the aeroplane is thus in the air and under control it may circle around to bring the endless rope 45 within reach of the members of the crew left on the ground so that he can climb or be drawn up through one of the manholes, the post and base socket being hauled up to the aeroplane either with him or as a separate operation. The aeroplane may then resume its flight.

While the base socket is shown as provided with an earth auger for securing it in fixed position any other convenient means adapted to the nature of the surface to or on which it is to be secured may be used. It might, for instance be lashed or otherwise secured to a stump or tree top, it being essential only that it be firmly secured in fixed position.

It will, of course, be understood that the size of the hull or body, the numbers of propellers for forward driving or for lifting, and details of construction may be varied as desired so long as the essential features of the socket at the center of gravity to receive the anchor post with the ribs radiating from its base is present in the construction.

Having thus described my invention, what I claim and desire to secure by Letters Patent of the United States, is:

1. In aircraft having a body or hull of boat form, a vertical socket at the center of the body or hull adapted to receive and rotate on a fixed anchor post and having the ribs for the body or hull radiating from the base of the socket.

2. In aircraft having a body or hull of boat form, a vertical socket at the center of the body or hull adapted to receive and rotate on a fixed anchor post and having the ribs for the body or hull radiating from the base of the socket, and a rope extending down through the socket to the anchor post.

3. In aircraft having a body or hull of boat form, a vertical socket at the center of the body or hull adapted to receive and rotate on a fixed anchor post, and manholes adjacent to the socket, one forward of the socket and the other in rear of it, extending through the bottom of the hull or body.

4. In aircraft having a body or hull of boat form, a vertical socket at the center of the body or hull adapted to receive and rotate on a fixed anchor post, manholes adjacent to the socket, one forward of the socket and the other in rear of it, extending through the bottom of the hull or body, a drum above the upper ends of the manholes having a diameter equal to the distance between the centers of the manholes, and an endless rope or band carried on the drum and so arranged that a portion of the endless rope or band depends through each manhole at its center.

5. In aircraft having a body or hull of boat form, a vertical socket at the center of the body or hull adapted to receive and rotate on a fixed anchor post, manholes adjacent to the socket, one forward of the socket and the other in rear of it, extending through the bottom of the hull or body, a drum above the upper ends of the manholes having a diameter equal to the distance between the centers of the manholes, and an endless rope or band carried on the drum and so arranged that a portion of the endless rope or band depends through each manhole at its center, and a rope extending down through the socket for connection with the anchor post.

6. In aircraft having a body or hull of boat form, a vertical socket at the center of the body or hull adapted to receive and rotate on a fixed anchor post, manholes adjacent to the socket, one forward of the socket and the other in rear of it, extending through the bottom of the hull or body, and ribs for the body or hull radiating from the base of the socket.

7. In aircraft having a body or hull of boat form, a vertical socket at the center of the body or hull adapted to receive and rotate on a fixed anchor post, a plate or forging at the base of the vertical socket having an opening at its center for said socket and ribs for the body or hull radiating from said plate or casting.

8. In aircraft having a body or hull of boat form, a vertical socket at the center of the body or hull adapted to receive and rotate on a fixed anchor post and a lifting propeller and means for operating it carried by the body or hull.

9. In aircraft having a body or hull of boat form, a vertical socket at the center of the body or hull adapted to receive and rotate on a fixed anchor post and a lifting propeller and means for operating it carried by the body or hull, and a rope extending down through the vertical socket for connection with the anchor post.

10. In aircraft having a body or hull of boat form, a vertical socket at the center of the body or hull adapted to receive and rotate on a fixed anchor post and a lifting propeller and means for operating it carried by the body or hull, the anchor post being provided with means for impelling the body or hull upward.

11. In aircraft having a body or hull of boat form, a vertical socket at the center of the body or hull adapted to receive and rotate on a fixed anchor post and a lifting propeller and means for operating it carried by the body or hull, the anchor post being provided with means for impelling the body or hull upward and a rope extending down through the vertical socket for connection with the anchor post.

12. In aircraft having a body or hull of boat form, a vertical socket at the center of the body or hull adapted to receive and rotate on a fixed anchor post, and an anchor post, means adapted to be placed under tension carried by it for impelling the body or hull upward.

13. In aircraft having a body or hull of boat form, a vertical socket at the center of the body or hull adapted to receive and rotate on a fixed anchor post, and an anchor post and means carried by it for impelling the body or hull upward, said means comprising a member vertically movable in the anchor post adapted to engage beneath the body or hull, elastic means connecting the movable member with the upper end of the anchor post, means for forcing the movable member downward on the anchor post to place the elastic means under tension.

14. In aircraft having a body or hull of boat form, a vertical socket at the center of the body or hull adapted to receive and rotate on a fixed anchor post, and an anchor post and means carried by it for impelling the body or hull upward, said means comprising a member vertically movable in the anchor post adapted to engage beneath the body or hull, elastic means connecting the movable member with the upper end of the anchor post, means for forcing the movable member downward on the anchor post to place the elastic means under tension and releasable means for holding the movable member at the lower end of the anchor post.

15. In aircraft having a body or hull of boat form, a vertical socket at the center of the body or hull adapted to receive and rotate on a fixed anchor post, and an anchor post having opposite slots longitudinal thereof and means carried by it for impelling the body or hull upward, said means comprising a cross bar vertically movable in the slots of the anchor post adapted to engage beneath the body or hull, and elastic means connecting the cross bar with the upper end of the anchor post.

16. In aircraft having a body or hull of boat form, a vertical socket at the center of the body or hull adapted to receive and rotate on a fixed anchor post, and an anchor post having opposite slots longitudinal thereof, and means carried by it for impelling the body or hull upward, said means comprising a cross bar vertically movable in the slots of the anchor post adapted to engage beneath the body or hull, elastic means connecting the cross bar with the upper end of the anchor post, means for forcing the movable member downward on the anchor post to place the elastic means under tension and releasable means for holding the movable member at the lower end of the anchor post.

17. In aircraft having a body or hull of boat form, a vertical socket at the center of the body or hull adapted to receive and rotate on a fixed anchor post, an anchor post provided with means for impelling the body or hull upward, a base socket provided with means for fixedly securing it in solid material and means for detachably securing the anchor post to the base socket.

18. In aircraft having a body or hull of boat form, a vertical socket at the center of the body or hull adapted to receive and rotate on a fixed anchor post and an anchor post provided with means for impelling the body or hull upward, a base socket, having a side opening, provided with means for fixedly securing it in solid material, means for detachably securing the anchor post to the base socket, a guide pulley within the socket and a rope extending from the upper end of the vertical socket through the post and its base socket and out through the side opening.

In testimony whereof, I hereunto affix my signature.

GEORGE B. STARKWEATHER.